Sept. 26, 1967  G. A. FELTON  3,343,805
DISC OR BUTTERFLY VALVES
Filed Sept. 29, 1964  2 Sheets-Sheet 1

Inventor
GEORGE AUBREY FELTON

By Hammond & Littell
Attorneys

United States Patent Office 3,343,805
Patented Sept. 26, 1967

3,343,805
DISC OR BUTTERFLY VALVES
George Aubrey Felton, Berkhamsted, England, assignor to The Loewy Engineering Company, Limited, Bournemouth, England, a company of Great Britain
Filed Sept. 29, 1964, Ser. No. 399,935
Claims priority, application Great Britain, Sept. 30, 1963, 38,451/63
3 Claims. (Cl. 251—306)

This invention relates to butterfly valves and has a particularly useful but not exclusive application in valves for controlling the flow of slurries, and solids held in suspension in liquids.

According to this invention in one aspect there is provided a value comprising a valve housing affording a valve chamber, an inlet to and an outlet from the valve chamber, and a butterfly valve member mounted in the chamber for rotation into an open position in which fluid can flow from the inlet to the outlet and in which the whole of the valve member is displaced from the direct lines of flow between the inlet and the outlet, and into a closed position in which the valve member extends across the chamber and seals off the inlet from the outlet, the axis of rotation of the butterfly valve member being contained in a plane which extends transversely to the general plane of the butterfly valve member and which contains the centre of the butterfly valve member. In a modified arrangement the axis of rotation of the butterfly valve member is offset a small distance from said plane which extends transversely to the general plane of the butterfly valve member.

According to a feature of the invention, the arrangement is such that the butterfly valve member is capable of rotation about said axis to sweep over those parts of the internal surface of the valve housing with which, when the valve is closed, the valve member forms a seal. Preferably, the butterfly valve member is rotatable through a full 360° in both directions.

According to the invention in another aspect there is provided a valve comprising a valve housing affording a passage therethrough, and a butterfly valve member which is mounted in the passage and which is rotatable about an axis into and out of a position in which the valve member prevents flow through the passage, the arrangement being such that the valve member is capable of rotation about said axis to sweep over those parts of the internal surface of the housing with which, when in said position, it forms a seal, for removing matter which may have been deposited on said parts.

The invention also provides a valve comprising a valve housing which is formed in two parts secured together and which affords a passage therethrough, a butterfly valve member rotatably mounted in one of said parts, and two valve seats formed one in one housing part and the other in the other housing part, the butterfly valve member being rotatably mounted about an axis between the valve seats into a first position in which the valve member forms a seal with one of the valve seats to close the valve, into a second position in which the valve member forms a seal with the other of the valve seats to close the valve, and into a third position in which the valve member permits flow through said passage.

Some embodiments of the invention will now be described by way of example with reference to the accompanying drawings in which.

Figure 1:
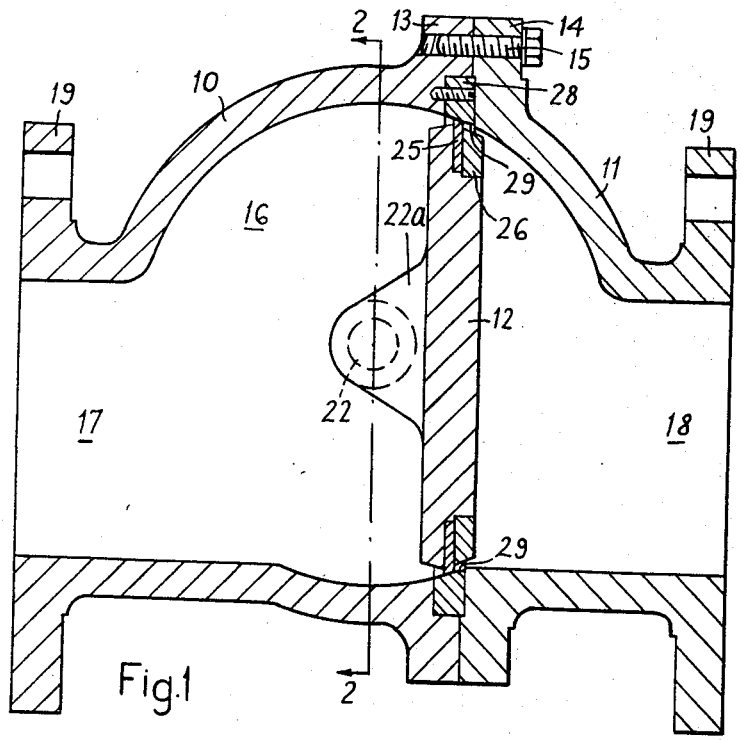
FIGURE 1 shows an axial section through a butterfly valve according to the invention, the valve being shown closed.
Figure 2:
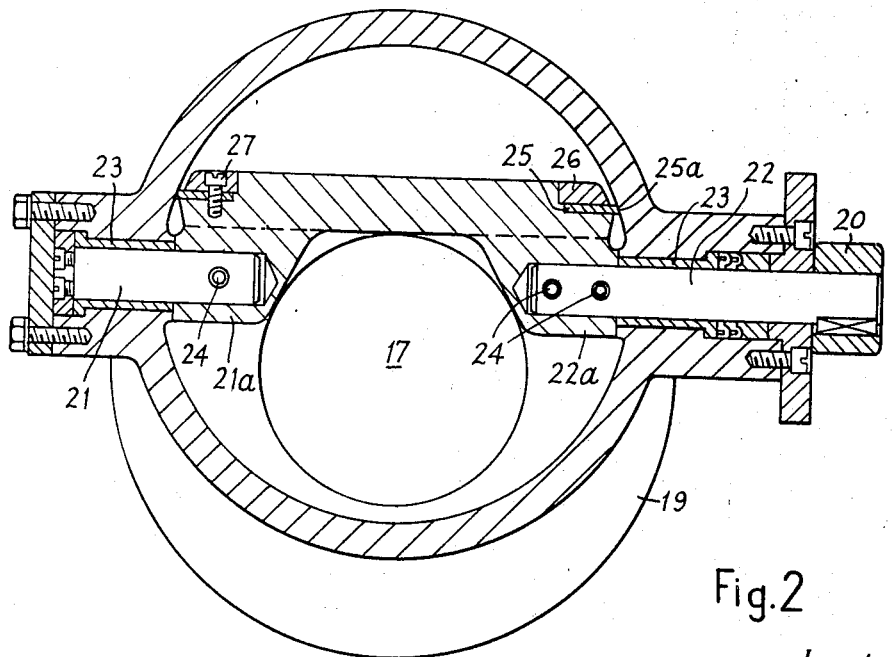
FIGURE 2 is a sectional end view on the plane 2—2 of FIGURE 1, the valve being shown open.

Referring to FIGURES 1 and 2 of the drawings, the valve comprises principally a housing constructed from two parts 10 and 11, and a disc butterfly valve member 12. Part 10 of the housing is bigger than part 11, and the two parts are flanged at 13, 14 respectively and are secured together by bolts 15 extending through the flanges. The housing provides a generally semi-spherical chamber 16 with an inlet passage 17 and an outlet passage 18 and end flanges 19 to enable the valve to be connected into a pipeline. Passages 17 and 18 have a diameter slightly greater than half the diameter of the chamber 16 and are in line with each other.

The disc or butterfly valve member 12 has secured by bolts 24 in lugs 21a, 22a therein two pivot pins 21, 22 disposed diametrically opposite each other which pins are carried in bearing bushes 23 secured in outwardly projecting bosses in the housing part 10. Pin 22 extends through its bearing bush for attachment of a control member 20 to adjust the position of the valve member. The sealing edge of the valve member is offset from the pivot axis and is formed by a sealing ring 25 secured in a rebate in the member 12 by a clamping ring 26 which is secured by screws 27 to the main part of the valve member. The outer face 25a of the sealing ring is tapered as shown (FIG. 2).

A valve seat insert 28 is secured by screws in a rebate in the housing part 10, and is shaped so that the edge of the sealing ring 25 fits very closely thereto. The position of the valve member when the valve is closed is shown in FIGURE 1. Just downstream of the sealing portion, at 29, the surface of the insert 28 is slightly relieved. The internal surfaces of the valve housing parts are shaped so that the valve member can be rotated through a full 360° in both directions. The valve member can thus be rotated to sweep the valve seat to remove any matter which may have become deposited thereon.

When the valve member is in its "open" position as shown in FIGURE 2, the chamber 16 is divided into two parts, the lower part serving to place the inlet and outlet passages in communication with each other and the upper part being substantially closed off. It will be seen that the valve member is wholly displaced to one side of the direct flow lines between the inlet and the outlet. Thus, all the fluid flowing through the valve passes below the valve member and the member is disposed completely out of the way of the fluid flowing through the valve.

The valve illustrated is particularly useful for controlling the flow of slurries, semi-solids and solids held in liquid suspension because the valve member can be rotated to clear sediment from the valve seating surfaces.

Figure 3:
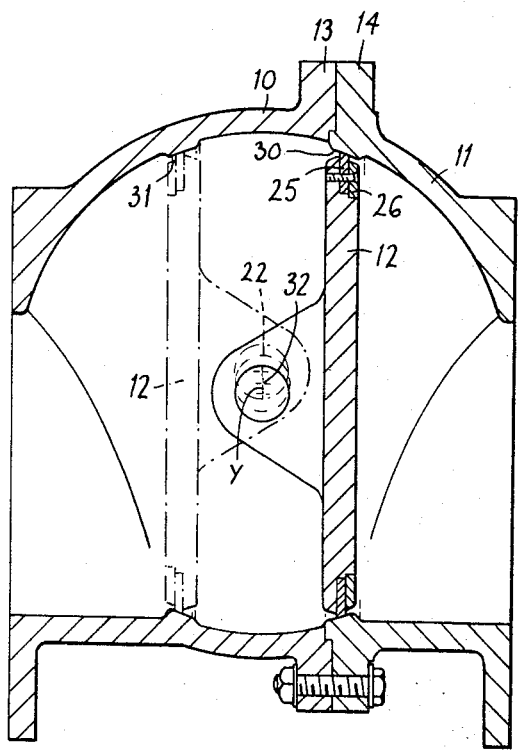
FIGURE 3 shows another construction in axial section.

A modification is shown diagrammatically in FIGURE 3, in which corresponding parts to those previously described are given corresponding reference numerals. In this modified arrangement, the main valve seat is however formed at 30 in the valve housing part 11, and a second valve seat 31 is formed in the housing part 10. The valve seats 30, 31 are contained in parallel planes and the axis of rotation 32 of the valve member 12 is disposed midway between these planes. The valve member 12 is rotatable through 360° as before to enable it to sweep the valve seats, but a rotation of 180° will carry the valve member from sealing engagement with one of the seats to sealing engagement with the other seat. When the valve member 12 is engaged with seat 31, as shown in chain lines, maintenance can be carried out on seat 30 without necessarily draining a pipeline in which the valve is disposed.

The pivot axis of the butterfly valve member 12 may if desired be offset by a small amount, e.g., 1/8″, from a plane transverse to the general plane of the valve member 12, as shown at Y in FIGURE 3, so that the sealing edge of the member is asymmetrically disposed relative to the pivot axis. This displacement of the axis reduces scuffing of the sealing ring and seating because the sealing ring is lifted clear of the seating in a shorter arc of movement of the member.

It will be understood that the seatings 30, 31 may be provided by inserts, if desired. The seatings may be convexly curved, viewed in cross-section. The sealing ring may be mounted in the housing and the seating surface provided on the valve member 12 if desired, but the illustrated arrangement is preferred. The sealing rings may be dispensed with in favour of metal to metal contact, if desired. Where sealing rings are provided, they may be of rubber or plastic or may be metallic. The outer edge may be convex instead of being straight as shown in the drawings.

In another construction of valve, not shown, the housing is formed in three parts, one of which is a ring, sandwiched between the other two parts. The housing may be split into more than three parts if necessary or desirable.

I claim:
1. A butterfly valve having a housing with cylindrical inlet and outlet portions and a valve chamber between said cylindrical portions, the axial extensions of said portions, defining a cylindrical flow passage through said chamber, a circular flap member, in the shape of a flat disc rotatably mounted in said chamber for controlling the flow through said passage, said flap member being offset from its axis of rotation, a first valve seat with which said flap member makes contact, the axis of rotation of said flap member being offset with regard to the axis of flow in said passage, said chamber having a spherically-shaped enlargement extending from the inlet to the outlet portions, the center of said spherically-shaped enlargement coinciding with the axis of rotation of said flap member, and the surface of said spherically-shaped enlargement being free from any internal projections into the rotary path of said flap member, thereby permitting rotation of said flap member about its axis in opposite directions by 360°, said flap member when in its fully open position being entirely within said spherically-shaped enlargement and entirely outside said cylindrical flow passage.

2. A butterfly valve according to claim 1, in which means for pivotally mounting said flap member in said chamber are entirely within said spherically-shaped enlargement and entirely outside said cylindrical flow passage when said flap member is in its fully open position.

3. A butterfly valve according to claim 1, in which the axis of rotation of said flap member is offset from the body of said flap member, and in which said valve chamber is provided with a second valve seat opposite said first valve seat, the center of said second valve seat coinciding with the center of said first valve seat.

References Cited

UNITED STATES PATENTS

| | | | |
|---|---|---|---|
| 344,172 | 6/1886 | Denmead | 251—301 X |
| 1,678,204 | 7/1928 | Srulowitz | 137—625.2 |
| 2,302,695 | 11/1942 | Kalix | 251—301 |
| 2,791,396 | 5/1957 | Reppert | 251—306 X |
| 2,905,197 | 9/1959 | Janes | 251—317 |
| 3,064,940 | 11/1962 | Anderson et al. | 251—306 |

FOREIGN PATENTS

| | | |
|---|---|---|
| 626,744 | 9/1961 | Canada. |
| 746,909 | 3/1956 | Great Britain. |
| 259,641 | 7/1949 | Switzerland. |

M. CARY NELSON, *Primary Examiner.*

H. KLINKSIEK, *Assistant Examiner.*